United States Patent
Yuan

(10) Patent No.: US 9,614,437 B2
(45) Date of Patent: Apr. 4, 2017

(54) SWITCHING REGULATOR AND CONTROL CIRCUIT AND CONTROL METHOD THEREFOR

(71) Applicant: Silergy Semiconductor Technology (Hangzhou) Ltd., Hangzhou (CN)

(72) Inventor: Xiaolong Yuan, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

(21) Appl. No.: 14/581,022

(22) Filed: Dec. 23, 2014

(65) Prior Publication Data

US 2015/0180341 A1  Jun. 25, 2015

(30) Foreign Application Priority Data

Dec. 25, 2013 (CN) .......................... 2013 1 0724816

(51) Int. Cl.
*G05F 1/00* (2006.01)
*H02M 3/156* (2006.01)
*H02M 1/00* (2006.01)

(52) U.S. Cl.
CPC .... *H02M 3/156* (2013.01); *H02M 2001/0032* (2013.01); *Y02B 70/16* (2013.01)

(58) Field of Classification Search
CPC .... H02M 3/156; H02M 3/1584; H02M 3/157; G05F 1/445
USPC ........ 323/222, 242, 271, 282, 283–285, 288
See application file for complete search history.

(56) References Cited

U.S. PATENT DOCUMENTS

| 2009/0322299 A1* | 12/2009 | Michishita | ............ | H02M 3/156 323/282 |
| 2010/0219803 A1* | 9/2010 | Han | ...................... | H02M 3/158 323/284 |
| 2012/0299562 A1* | 11/2012 | Noda | ................... | H02M 3/1588 323/271 |

FOREIGN PATENT DOCUMENTS

| CN | 102684458 | A | 9/2012 |
| CN | 102769378 | A | 11/2012 |
| CN | 202798467 | U | 3/2013 |
| CN | 103368360 | A | 10/2013 |
| CN | 103401404 | A | 11/2013 |
| CN | 103683869 | A | 3/2014 |
| CN | 103683908 | A | 3/2014 |

OTHER PUBLICATIONS

First Office Action for Chinese Patent Application No. 201310724816.4, dated Jul. 21, 2015, 7 pages.

* cited by examiner

*Primary Examiner* — Nguyen Tran
(74) *Attorney, Agent, or Firm* — Westman, Champlin & Koehler, P.A.

(57) ABSTRACT

Disclosed are a switching regulator and a control circuit and a control method therefor. In one embodiment, a switching control signal with decreasing on time is generated to control a power switch in a second mode so that audio noise can be avoided when the switching regulator operates in a light loaded or unloaded condition.

19 Claims, 8 Drawing Sheets

SWITCHING REGULATOR AND CONTROL CIRCUIT AND CONTROL METHOD THEREFOR

CLAIM OF PRIORITY AND CROSS-REFERENCE TO RELATED APPLICATION(S)

This application claims the benefit of Chinese Patent Application No. 201310724816.4, filed on Dec. 25, 2013, which is incorporated herein by reference in its entirety.

BACKGROUND OF THE INVENTION

1. Field of the Invention

The present invention relates to the field of power electronics, and particularly to a switching regulator and a control circuit and a control method therefor.

2. Description of the Related Art

A switching regulator typically comprises a power stage and a control circuit. The control circuit can consider variations in an input voltage, internal parameters and external loads, and may regulate the ratio of on/off time of the switch system in the power stage, so that an output voltage or an output current of the switching power supply can be maintained as substantially constant. Therefore, design of a particular control circuitry and approach is very important to the overall performance of the switching regulator. Thus, adopting different detection signals and/or control circuits may result in different control effects on performance.

The control patterns of a switching regulator comprise constant frequency control and variable frequency control. The constant frequency control (i.e. Pulse Width Modulation, PWM) is a control method in which the switching cycle is maintained as constant, and the voltage regulation is achieved by adjusting on time of a switch in a switching cycle.

The variable frequency control (i.e. Pulse Frequency Modulation, PFM) comprises various control methods such as constant on time control, constant off time control, current hysteresis control, etc. In constant on time control, the on time of a power switch is maintained as constant, and the duty cycle is adjusted by changing the off time of the power switch. In constant off time control, the off time of the power switch is maintained as constant, and the duty cycle is adjusted by changing the on time of the power switch.

In constant on time control, when load of the switching regulator varies, for the purpose of power loss reduction, the prior art typically reduces the on/off frequency of the power switch in the power stage by omitting or shielding pulses (i.e. reducing the frequency of switching control signal), so that the control circuit operates in an intermittent manner.

However, when the frequency of switching control signal drops into audio range (20 Hz-20 KHz), the on/off of the switch may lead to audio noise.

BRIEF DESCRIPTION OF THE INVENTION

In view of this, one object of the present disclosure is to provide a switching regulator and a control circuit and a control method therefor.

According to one aspect of the present disclosure, there is provided a control circuit for controlling a power switch in a power stage of a switching regulator, comprising: a set pulse generator configured to generate set pulses in accordance with a feedback voltage, a ripple signal and a reference voltage, wherein the feedback voltage is obtained from an output voltage of the power stage; a reset pulse generator configured to generate reset pulses in a one to one correspondence with the set pulses, wherein in a first mode a time interval between each the reset pulse and a neighboring set pulse preceding thereto is constant, and in a second mode the time interval decreases with time; and a logic circuit configured to generate a switching control signal in accordance with the set pulses and the reset pulses, wherein the switching control signal turns on the power switch when the set pulse occurs and turns off the power switch when the reset pulse occurs.

According to another aspect of the present disclosure, there is provided a switching regulator comprising above-mentioned control circuit.

According to another aspect of the present disclosure, there is provided a control method for a switching regulator comprising a power stage with a power switch and a control circuit therefor. The method comprises: generating a switching control signal with constant on time to control the power switch in a first mode; generating a switching control signal with decreasing on time to control the power switch in a second mode.

In the present disclosure, a switching control signal with decreasing on time is generated to control a power switch in a second mode so that audio noise may be avoided when the switching regulator operates in a light loaded or unloaded condition.

BRIEF DESCRIPTION OF THE DRAWINGS

The implementations of the present disclosure are illustrated in the drawings. The drawings and implementations provide some embodiments of the disclosure non-exclusively without limitation, wherein.

DETAILED DESCRIPTION OF EMBODIMENTS OF THE INVENTION

Reference will now be made in detail to particular embodiments of the disclosure, examples of which are illustrated in the accompanying drawings. However, the present disclosure is intended to encompass any substitutions, modifications, equivalents, etc., made thereto without departing from the spirit and scope of the present disclosure. In the description below, a number of particular details are explained to provide a better understanding to the disclosure. However, it is apparent to those skilled in the art the disclosure can be implemented without these particular details. In other instances, well known circuits, materials or methods are not described so as not to obscure the aspects of the present disclosure.

In addition, it is to be understood that the drawings are only for illustration purpose, and these drawings are not necessarily drawn to scale. Also, it is to be understood that when an element is referred to as being "connected to," or "coupled to" another element, it may be directly connected or coupled to the other element, or intervening elements may be present. Two elements may be connected to each other physically, electronically, logically, or in any other manner, through one or more additional elements. In contrast, when an element is referred to as being "directly connected to," or "directly coupled to" another element, there may be no intervening elements present. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to."

Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

In the description below, terms such as "first," and "second," are used herein for purposes of description and are not intended to indicate or imply relative importance or significance. In addition, unless the context clearly requires otherwise, term "a plurality of" is to be construed as "more than two".

In the description below, "power switch" refers to a switch element in a switching regulator which is turned on to enable an inductive element in the switching regulator to store energy so that there is rise of a current on the inductive element. Correspondingly, "rectifying element" refers to an element in a switching regulator, which is turned on actively or passively to enable the inductive element to release energy so that there is drop of the current on the inductive element.

The present disclosure may be presented in various forms, some examples of which will be described below.

Figure 1A:
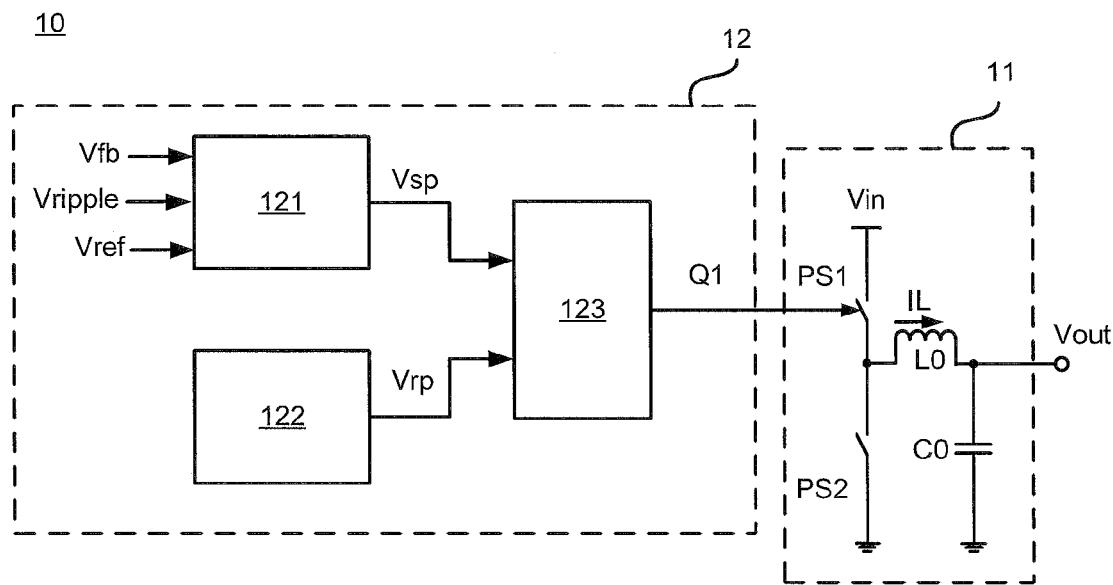
FIG. 1A is a schematic diagram of a switching regulator in accordance with a first embodiment of the present disclosure.

FIG. 1A is a schematic diagram of a switching regulator in accordance with a first embodiment of the present disclosure. As shown in FIG. 1A, switching regulator 10 comprises power stage 11 and control circuit 12. Power stage 11 comprises power switch PS1, rectifying element PS2, inductive element L0 and filtering element C0. In the present disclosure, a power switch in a power stage refers to a switch which is turned on periodically so that energy flows into the inductive element, and the energy is stored by the inductive element in a DC-DC regulator. A rectifying element/switch refers to an element or a switch which is turned on periodically so that energy flows to a load.

In the present embodiment, power switch PS1 may be any controlled semiconductor switching device, such as Metal-Oxide-Semiconductor Field Effect Transistor (MOSFET) and Insulated Gate Bipolar Transistor (IGBT) etc. Rectifying element PS2 is electrically coupled to power switch PS1. In the present embodiment, rectifying element PS2 may adopt a diode or any kinds of controlled semiconductor switch such as Metal-Oxide-Semiconductor Field Effect Transistor (MOSFET) and Insulated Gate Bipolar Transistor (IGBT) etc. Inductive element L0 is electrically coupled to power switch PS1 which switches between states of storing energy and releasing energy with on and off of power switch PS1. Inductive element L0 may be an inductor or a transformer. Filtering element C0 is configured to smooth output voltage Vout, which may be a capacitor or a filtering circuit.

In FIG. 1A, power stage 11 is configured as a buck topology. However, it is to be understood by those skilled in the art that power stage 11 may adopt other well-known circuit topologies such as a boost topology and a buck-boost topology as necessary.

Control circuit 12 comprises set pulse generator 121, reset pulse generator 122 and logic circuit 123.

Set pulse generator 121 is configured to generate set pulses Vsp in accordance with feedback voltage Vfb, ripple signal Vripple and reference voltage Vref. In the present embodiment, set pulse generator 121 generates set pulse Vsp approximately at the energy peak or energy valley of the inductive element in accordance with feedback voltage Vfb, ripple signal Vripple and predetermined reference voltage Vref by means of feedback control.

Figure 1B:
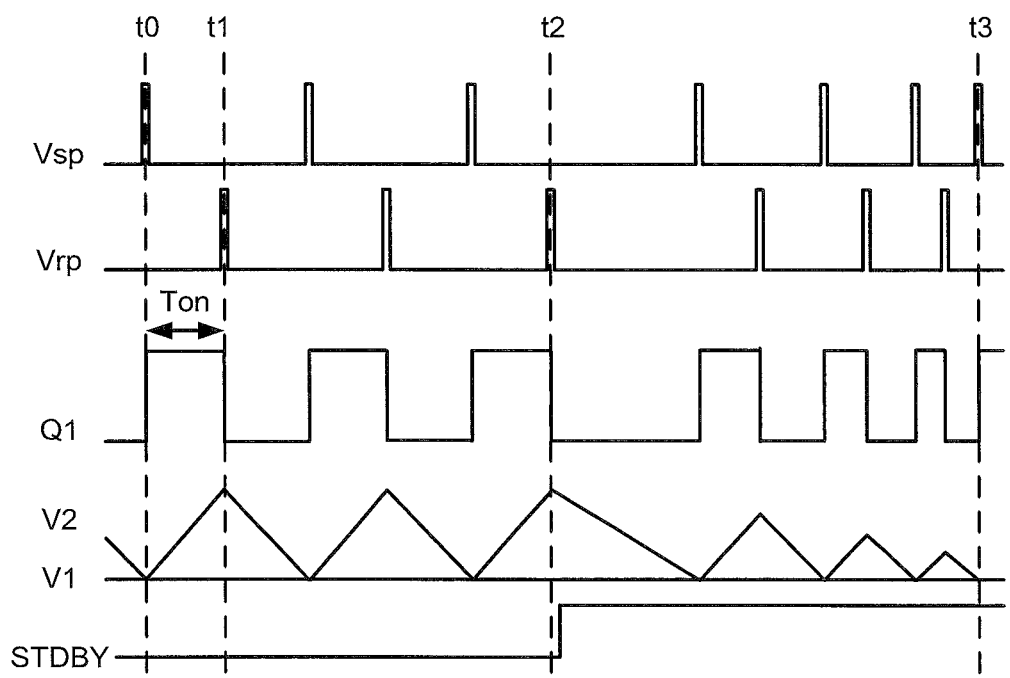
FIG. 1B is a waveform diagram showing example operation of the switching regulator in accordance with the first embodiment of the present disclosure.

As shown in FIG. 1B, set pulse generator 121 is configured to generate first voltage V1 and second voltage V2 varying with a switching control signal synchronously, and to output a set pulse when second voltage V2 drops to first voltage V1. First voltage V1 and second voltage V2 are obtained in different manners.

Preferably, ripple signal Vripple is a signal varying synchronously and in phase with inductor current IL of inductive element L0 in the power stage, which may indicate the energy valley of the inductive element.

Reset pulse generator 122 is configured to generate reset pulses Vrp in a one to one correspondence with set pulses Vsp, wherein, in a first mode (i.e. in a normal condition), a time interval between each reset pulse Vrp and neighboring set pulse Vsp preceding thereto is maintained as constant. In a normal condition, control circuit 12 controls power stage 11 to output a substantially constant voltage Vout. In a second mode which may be a light loaded or unloaded condition indicated by a mode signal, a time interval between each reset pulse Vrp and neighboring set pulse Vsp preceding thereto decreases with time.

Logic circuit 123c is configured to output switching control signal Q1 which turns on the power switch when set pulse Vsp occurs and turns off the power switch when reset pulse Vrp occurs. In other words, when adopting a high level as a logical valid level, switching control signal Q1 is set by set pulse Vsp and reset by reset pulse Vrp. It is to be understood by those skilled in the art that "set" in "set pulse" and "reset" in "reset pulse" may not be limited to their literal interpretations but refer to setting as a logical valid level for turning on a switch and setting as a logical invalid level for turning off a switch. For example, when adopting a low level as the logical valid level, switching control signal Q1 is set at the low level by set pulse Vsp so as to turn on power switch PS1, and is set at a high level by reset pulse Vrp so as to turn off power switch PS1.

Because set pulse Vsp can control logic circuit 123 to set switching control signal Q1 at a logical valid level to turn on power switch PS1, and reset pulse Vrp can control logic circuit 123 to set switching control signal Q1 at the invalid level to turn off power switch PS1, reset pulse generator 122 is configured to render switching control signal Q1 constant on time in the first mode so that a control loop of set pulse generator 121 may adjust the moment outputting the set pulse in accordance with the status of a load, and off time Toff of switching control signal Q1 is regulated to obtain a substantially constant output.

In the second mode, reset pulse generator 122 is configured to render switching control signal Q1 variable on time which decreases with time. As on time Ton decreases, set pulse generator 121 may regulate the moment of subsequent set pulses in accordance with feedback Vfb and ripple signal Vripple so as to decrease off time Toff, so that the duty cycle of switching control signal is maintained as constant, and a substantially constant output voltage is obtained. Therefore, the frequency of switching control signal Q1 increases in the second mode, which would not drop into an audio range.

FIG. 1B is a waveform diagram showing the example operation of the switching regulator in FIG. 1A. In a normal condition, in time interval from t0 to t2, set pulses Vsp occur periodically, and reset pulses Vrp occur periodically in a one to one correspondence therewith, and logic circuit 123 generates switching control signal Q1 with constant on time Ton. In a light loaded or unloaded condition, in time interval after t2, because decrease in load leads to rise in the output voltage and drop in the decreasing rate of inductor current IL, the occurrence of subsequent reset pulses Vsp is delayed, so that the switching cycle of switching control signal Q1 is extended and the frequency thereof decreases.

Then, in accordance with mode signal STDBY indicating the second mode, the time interval between reset pulse Vrp and neighboring set pulse Vsp preceding thereto start to decrease with time.

In the present embodiment, a switching control signal with decreasing on time is generated in a second mode so that audio noise can be avoided when a switching regulator operates in a light loaded or unloaded condition.

Figure 2A:
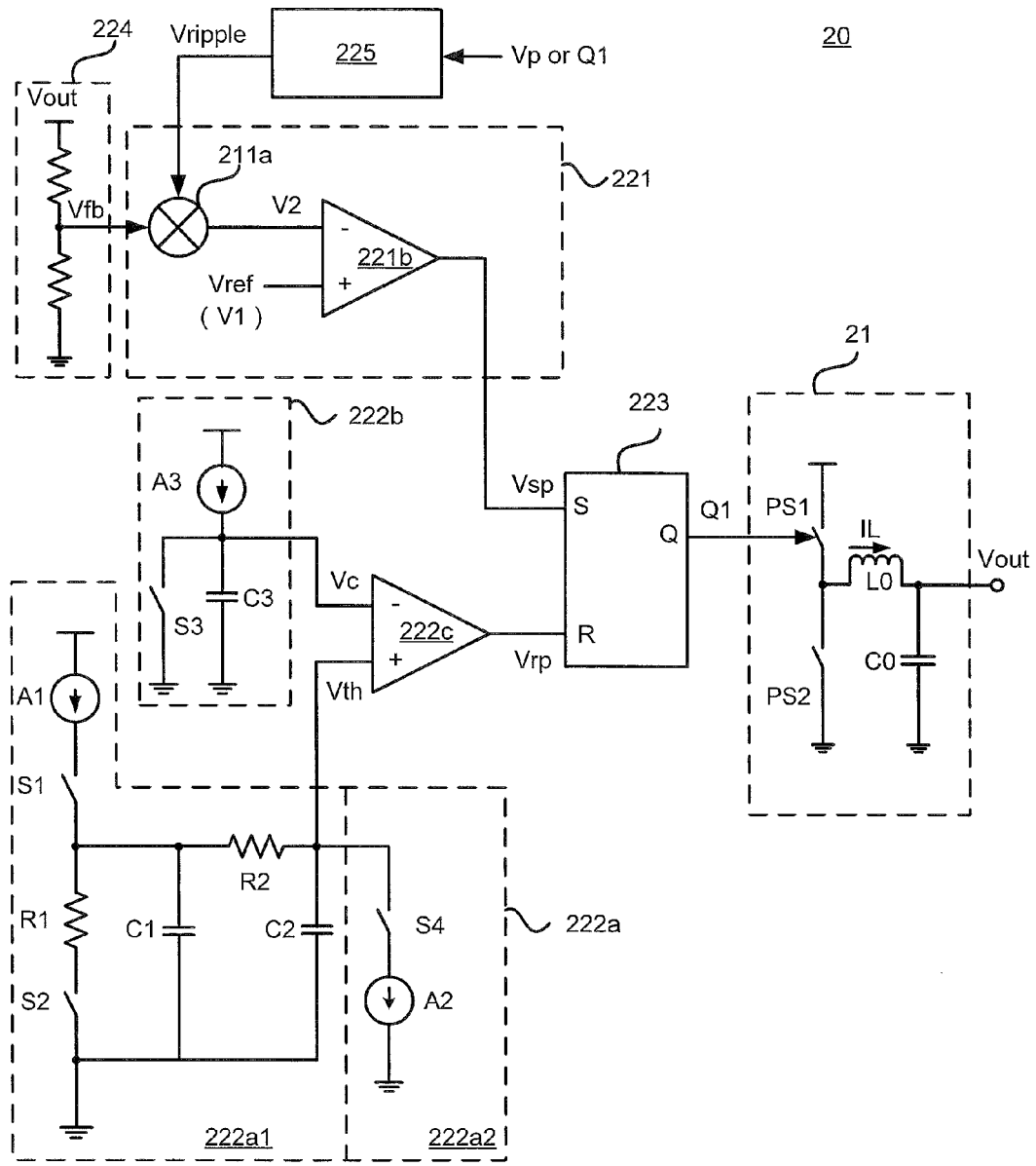
FIG. 2A is a schematic diagram of a switching regulator in accordance with a second embodiment of the present disclosure.

FIG. 2A is a schematic diagram of a switching regulator in accordance with a second embodiment of the present disclosure. In the present embodiment, switching regulator 20 comprises power stage 21 and control circuit 22. Wherein, the structure of power stage 21 is substantially the same with the corresponding circuit shown in FIG. 1A, and will not be illustrated herein. It is to be understood by those skilled in the art that power stage 21 may adopt other well-known circuit topologies such as a boost topology and a buck-boost topology as necessary.

Control circuit 22 comprises set pulse generator 221, reset pulse generator 222 and logic circuit 223. Preferably, control circuit 22 further comprises feedback circuit 224 and ripple generator 225.

Set pulse generator 221 comprises superimposing circuit 221a and first comparing circuit 221b.

By voltage division, feedback circuit 224 outputs feedback voltage Vfb proportional to output voltage Vout to superimposing circuit 221a. Ripple generator 225 is configured to generate ripple signal Vripple which is preferably synchronous and in phase with inductor current IL on inductive element L0. Superimposing circuit 221a is configured to superimpose feedback voltage Vfb and ripple signal Vripple to generate second voltage V2. Therefore, second voltage V2 is obtained by superimposing feedback voltage Vfb and ripple signal Vripple. As shown in FIG. 2A, feedback circuit 224 comprises two resistors, which are coupled in series between an output terminal of the power stage and a ground so that feedback voltage Vfb is obtained from a common terminal of both resistors.

It is to be understood by those skilled in the art that feedback circuit 224 and ripple generator 225 may adopt circuits well known in the art. Ripple generator 225 may generate ripple signal Vripple varying with inductor current IL in accordance with a voltage Vp on a phase node of the power stage or in accordance with a feedback switching control signal Q1 or a signal synchronous therewith. In the present disclosure, a phase node in a power stage refers to a node in a DC-DC regulator on which the voltage reverse polarity in accordance with on and off of a power switch, wherein, in a buck topology, the phase node is the common terminal of the power switch and the rectifying element.

It is to be understood by those skilled in the art that the abovementioned circuits are distinguished from each other in their functions without limiting their configurations. As necessary, set pulse generator 221, feedback circuit 224 and ripple generator 225 may be fabricated together in an integrated circuit, or, set pulse generator 221 may be fabricated in an integrated circuit separately, or, set pulse generator 221 and either of feedback circuit 224 and ripple generator 225 may be fabricated together.

Figure 2B:
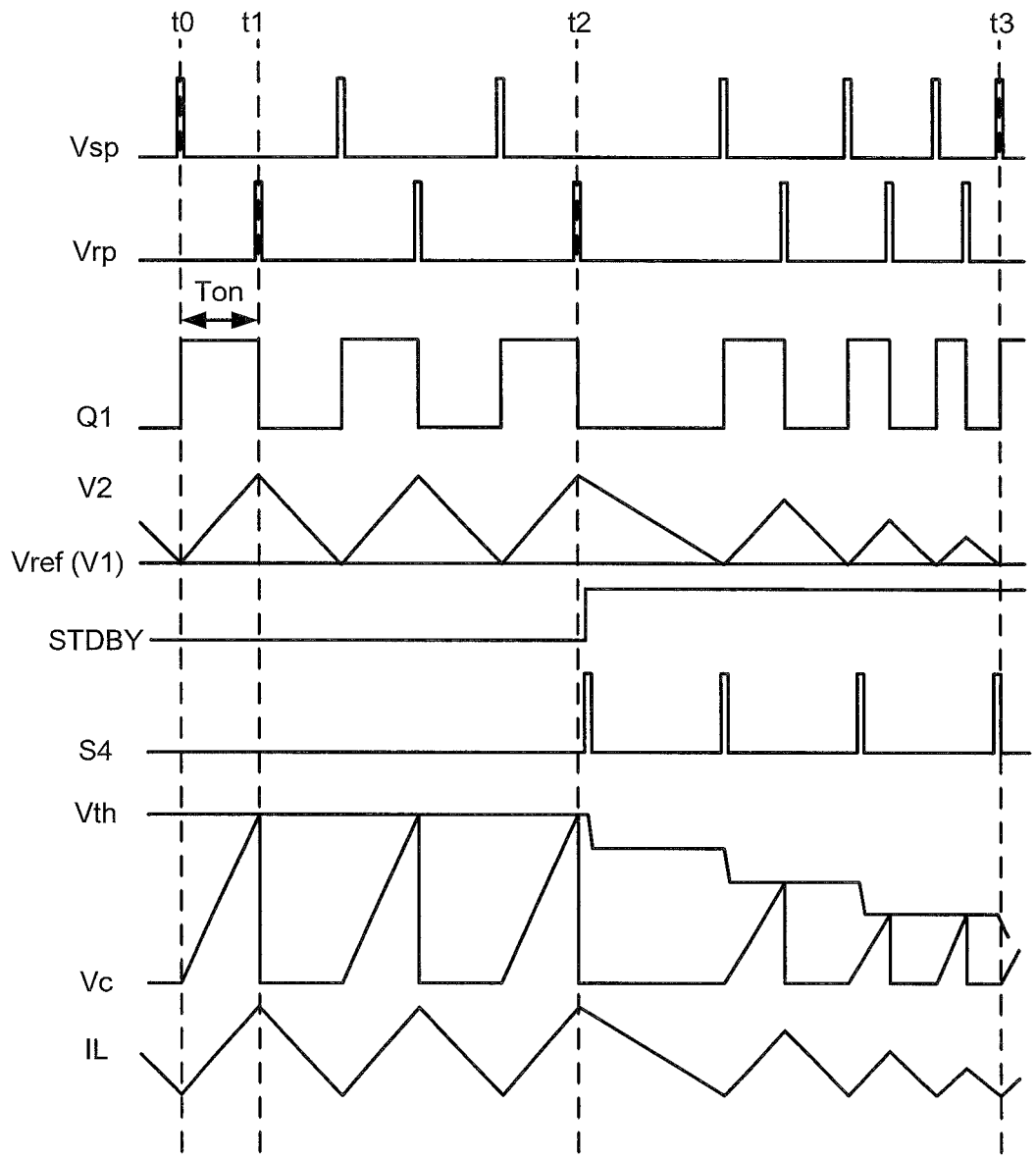
FIG. 2B is a waveform diagram showing example operation of the switching regulator in accordance with the second embodiment of the present disclosure.

FIG. 2B is a waveform diagram showing example operation of the switching regulator shown in FIG. 2A. As shown in FIGS. 2A and 2B, second voltage V2 is implemented to an inverting input terminal of first comparing circuit 221b, an non-inverting input terminal of which is implemented to reference voltage Vref (in the present embodiment, Vref is used as first voltage V1). A high level signal is generated when second voltage V2 drops to first voltage V1 (i.e. reference voltage Vref), which turns on power switch PS1 to let energy flow into the power stage, therefore, second voltage V2 start to rise again to be maintained greater than first voltage V1. Then, the output of set pulse generator is resumed to a low level, so that set pulse Vsp is generated when second voltage V2 drops to reference voltage Vref.

Reset pulse generator 222 comprises threshold generator 222a, sawtooth generator 222b and second comparing circuit 222c.

Threshold generator 222a is configured to generate a constant threshold voltage in the first mode and a decreasing threshold voltage in the second mode.

Particularly, in a preferable implementation, threshold generator 222a comprises energy storage circuit 222a1 and discharger 222a2.

Wherein, energy storage circuit 222a1 is charged in the first mode to generate constant threshold voltage Vth at a threshold terminal, and the charging is stopped in second mode so that energy storage circuit 222a1 provide with threshold voltage Vth at the threshold terminal based on the energy stored therein.

Discharger 222a2 is coupled with the threshold terminal of energy storage circuit 222a1, which is maintained off in the first mode and turned on in a predetermined frequency in the second mode to discharge the threshold terminal to generate a decreasing threshold voltage Vth.

More specifically, discharger 222a2 comprises a control module which is not shown in FIG. 2A, discharge switch S4 and second current source A2, wherein, discharge switch S4 and second current source A2 are coupled in series between threshold terminal and the ground, and a control terminal of discharge switch S4 is coupled with the control module which controls discharge switch S4 to be turned on in the predetermined frequency in the second mode and keep off in the first mode.

Preferably, the predetermined frequency is greater than 20 KHz.

Figure 3:
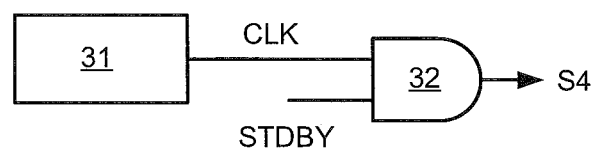
FIG. 3 is a schematic diagram of a control module for a discharge switch in a discharger in accordance with the second embodiment of the present disclosure.

The control module, which is illustrated in FIG. 3, comprises clock source 31 and logic gate 32 which generate a control signal for the discharge switch in accordance with clock signal from clock source 31 and mode signal STDBY. The waveform of operation is shown in FIG. 2B. It is to be understood by those skilled in the art that clock source 31 may be a built-in clock source or external clock source. In addition, it is to be understood that the logical valid level of mode signal STDBY may be set as a high level or a low level which adopts different logic gates for controlling adaptively.

More specifically, energy storage circuit 222a1 comprises an input terminal, an intermediate terminal, the threshold terminal, first current source A1, first switch S1, first resistor R1, second switch S2, first capacitor C1, second resistor R2 and second capacitor C2.

Wherein, first current source A1 and first switch S1 are coupled in series between the input terminal and the intermediate terminal. First resistor R1 and second switch S2 are coupled between the intermediate terminal and the ground. First capacitor C1 is coupled between the intermediate terminal and the ground. Second resistor is coupled between the intermediate terminal and the threshold terminal, and second capacitor C2 is coupled between the threshold terminal and the ground.

First switch S1 and second switch S2 are controlled by mode signal STDBY to be turned on in the first mode, so that there generates a voltage across first resistor R1 to charge first capacitor C1 until the voltage across first capacitor C1 gradually increases to Vc1=R1*IA1. A low pass filter composed of second resistor R2 and second capacitor C2 may smooth the voltage across first capacitor C1 to output a substantially constant threshold voltage Vth. Threshold voltage Vth is an average of the voltage across first capacitor C1. In the second mode, first switch S1 and second switch S2 are turned off to stop charging first capacitor C1 which provides the threshold terminal of energy storage circuit 222a1 with the threshold voltage by energy stored therein. Discharger 222a2 discharges the threshold terminal of energy storage circuit 222a1 in a predetermined frequency in the second mode to decrease threshold voltage Vth at the threshold terminal in a predetermined rate.

Figure 2C:
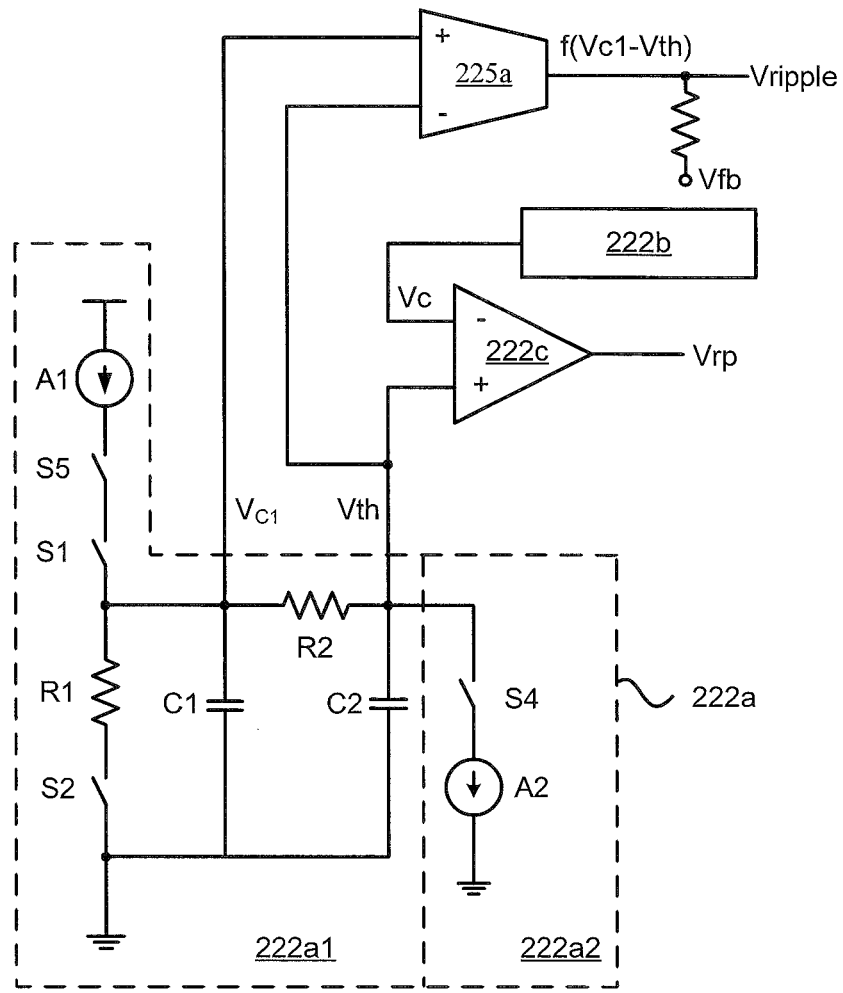
FIG. 2C is a schematic diagram of a ripple generator and a reset pulse generator in a preferable implementation in accordance with the second embodiment of the present disclosure.

In a preferable implementation, energy storage circuit 222a1 may be configured as a part of ripple generator 225 shared by ripple generator 225 and threshold generator 222a. FIG. 2C is a schematic diagram of ripple generator 225 and reset pulse generator 222 in accordance with abovementioned preferable implementation. As shown in FIG. 2C, reset pulse generator 222 is substantially the same to that shown in FIG. 2A except the energy storage circuit. Compared to the embodiment in FIG. 2A, energy storage circuit 222a1 further comprises fifth switch S5 which is coupled between the input terminal and the intermediate terminal in series with first current source A1 and first switch S1 and is turned on and off simultaneously with power switch PS1. Preferably, fifth switch S5 is controlled by switching control signal Q1.

In the first mode (i.e. in a normal condition), first switch S1 and second switch S2 are on, and fifth switch S5 is turned on and off simultaneously with power switch PS1. When fifth switch S5 is on, first capacitor C1 is charged by first current source A1, and voltage Vc1 on the intermediate terminal increases. When fifth switch S5 is off, first capacitor C1 is discharged through first resistor R1, and voltage Vc1 on the intermediate terminal decreases. Therefore, a voltage wave rising and dropping with on and off of power switch PS1 is generated on the intermediate terminal, which is substantially synchronous with inductor current IL of the power stage. Meanwhile, after filtering voltage Vc1 on the intermediate terminal by the filter composed of second resistor R2 and second capacitor C2, constant threshold voltage Vth is outputted on the threshold terminal, which is the average of voltage Vc1.

By setting the current of first current source A1 as Vout/R1 and setting the parameter of first resistor R1, first capacitor C1, second resistor R2 and second capacitor C2, threshold voltage Vth may equal to kVout, i.e. threshold voltage Vth is proportional to output voltage Vout, wherein preferably k=1. Ripple generator 225 further comprises error amplifier 225a which is preferably a transconductance amplifier. The input terminals of error amplifier 225a are inputted with voltage Vc1 on the intermediate terminal and threshold voltage Vth respectively. A signal f(Vc1−Vth) representing a difference between voltage Vc1 and threshold voltage Vth is generated which may be further converted to ripple signal Vripple. Ripple signal Vripple is a voltage wave rising and dropping with on and off of power switch PS1. Since inductor current IL of inductive element L0 in the power stage also increases and decreases with on and off of power switch PS1 synchronously, error amplifier 225a outputs a signal synchronous and in phase with inductor current IL, which may be used to generated set pulse signal Vsp.

In second mode, first switch S1 and second switch S2 are off, and voltage Vc1 on the intermediate terminal and threshold voltage Vth keep decreasing with discharging operation by discharger 222a2, and a difference between these two voltages also keeps decreasing. Therefore, in the second mode, ripple signal Vripple converges to 0, and the set pulse generator generates the set pulse in accordance with the fluctuation of feedback voltage Vfb.

It should be noted that, in the second mode, variations of ripple signal Vripple have no influence in the frequency of set pulse Vsp. Because the frequency of reset pulse increases as the decrease of threshold voltage, feedback voltage Vfb fluctuate in an increasing frequency, which results in increase in the frequency of set pulse Vsp.

In the preferable implementation, ripple generator 225 and threshold generator 222a may share energy storage circuit 222a1, so as to achieve advantages of less elements and compact structure.

Figure 4:
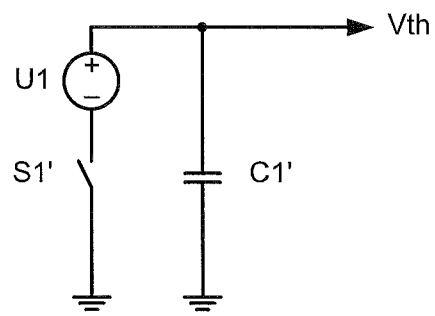
FIG. 4 is a schematic diagram of an alternative implementation of an energy storage circuit in accordance with the second embodiment of the present disclosure.

Alternatively, energy storage circuit 222a1 may adopt simplified circuitry as shown in FIG. 4, which comprises voltage source U1, first switch S1' and first capacitor C1'. Voltage source U1 and first switch S1' are coupled in series between the threshold terminal and the ground, and first capacitor C1' is coupled between the threshold terminal and the ground. In accordance with the mode signal, first switch S1' is turned on in the first mode and turned off in the second mode.

Sawtooth generator 222b is configured to generate sawtooth wave Vc with same cycle to that of the switching control signal in accordance with switching control signal Q1 or an inversion thereof.

Particularly, sawtooth generator 222b comprises third current source A3, third switch S3 and third capacitor C3. Third switch S3 is controlled by the inversion of switching control signal Q1. In other words, third switch S3 is turned off when power switch PS1 is on, meanwhile, it is turned on when power switch PS1 is off. Third capacitor C3 is coupled between third current source A3 and the ground parallel with third switch S3. Sawtooth generator 222b outputs sawtooth wave Vc at a common terminal of third capacitor C3 and third current source A3.

When third switch S3 is off, third current source A3 charges third capacitor C3 so that the voltage across the third capacitor starts to rise linearly, and when third switch S3 is on, the output terminal of sawtooth generator 222b is coupled to the ground so that Vc is maintained as 0 until third switch S3 is turned off again. Because third switch S3 has same cycle with that of switching control signal Q1, sawtooth wave generated by sawtooth generator 222b has same cycle with that of switching control signal Q1. The rise time of sawtooth wave equals to the on time of the switching control signal.

Second comparing circuit 222c is configured to compare sawtooth wave Vc and threshold voltage Vth to output reset pulse Vrp when the sawtooth wave rises to the threshold voltage. Particularly, second comparing circuit 222c comprises a comparator.

In the first mode which is preferably a normal condition, constant threshold voltage Vth is implemented to a non-inverting input terminal of second comparing circuit 222c, and sawtooth wave Vc is implemented to an inverting input terminal thereof. As shown in FIG. 2B, when voltage level of sawtooth wave Vc is lower than that of threshold voltage Vth, second comparing circuit 222c outputs a low level, and when sawtooth wave Vc rise to threshold voltage Vth, second comparing circuit 222c outputs a high level which enables logic circuit 223 to reset the switching control signal to turn off power switch PS1. As described, because third switch S3 is on when power switch PS1 is off, sawtooth wave Vc is reset soon after rising to threshold voltage Vth to enable second comparing circuit 222c to output a low level. Therefore, when sawtooth wave Vc rises to threshold voltage Vth, second comparing circuit 222c outputs reset pulse Vrp. Then, when set pulse Vsp turns on power switch PS1, third switch S3 is turned off, and sawtooth wave Vc is resumed to rise from zero. Therefore, the time interval in which sawtooth wave Vc rises from zero to threshold voltage Vth is the on time of the power switch.

In the second mode which is preferably a light loaded or unloaded condition, decreasing threshold voltage Vth is implemented to the non-inverting terminal of second comparing circuit 222c, and sawtooth wave Vc is implemented to the inverting terminal thereof. It is similar with the first mode that when sawtooth wave Vc varies to threshold voltage Vth, second comparing circuit 222c outputs reset pulse Vrp. Because threshold voltage Vth decreases with time, and the rising slope of the sawtooth wave is constant, the time interval in which sawtooth wave Vc rises to threshold voltage Vth decreases accordingly. This results in that a time interval between reset pulse Vrp and neighboring set pulse Vsp preceding thereto decreases. Meanwhile, the time interval in which sawtooth wave Vc rises from zero to threshold voltage Vth equals to the on time of the power switch. Since threshold voltage Vth decreases with time, the on time of power switch PS1 decreases therewith.

In the present embodiment, logic circuit 223 comprises an RS flip-flop. An output terminal of set pulse generator 221 is coupled to set terminal S of the RS flip-flop. An output terminal of reset pulse generator 222 is coupled to reset terminal R of the RS flip-flop. An output terminal of the RS flip-flop is coupled to a control terminal of power switch PS1. It is to be understood by those skilled in the art that well-known driving circuits may be implemented between the RS flip-flop and power switch PS1 for better performance. Meanwhile, to adapt to different configurations of logical valid level of control signals, the logic circuit may further comprise logic gates or driving circuit for voltage level conversion as necessary.

As shown in FIG. 2B, in the first mode which is preferably a normal condition, set pulse Vsp implemented to set terminal S of the RS flip-flop occurs periodically, and reset pulse Vrp implemented to reset terminal R of the RS flip-flop occurs alternatively with set pulse Vsp in a one to one correspondence. In the second mode which is preferably a light loaded or unloaded condition, in the time interval after t2, because the decrease in load leads to rise in the output voltage and drop in decreasing rate of inductor current IL, the occurrence of subsequent reset pulses Vsp is delayed, so that the switching cycle of switching control signal Q1 is extended and the frequency thereof decreases.

Then, in accordance with mode signal STDBY indicating the second mode, the time intervals between reset pulse Vrp and neighboring set pulse Vsp preceding thereto start to decrease with time, and the on time of the switching control signal decreases, so that the switching cycle of switching control signal Q1 is reduced and the frequency thereof increases.

Therefore, in the second mode, the frequency of switching control signal is controlled to increase so as to avoid the occurrence of audio noise.

Figure 5:
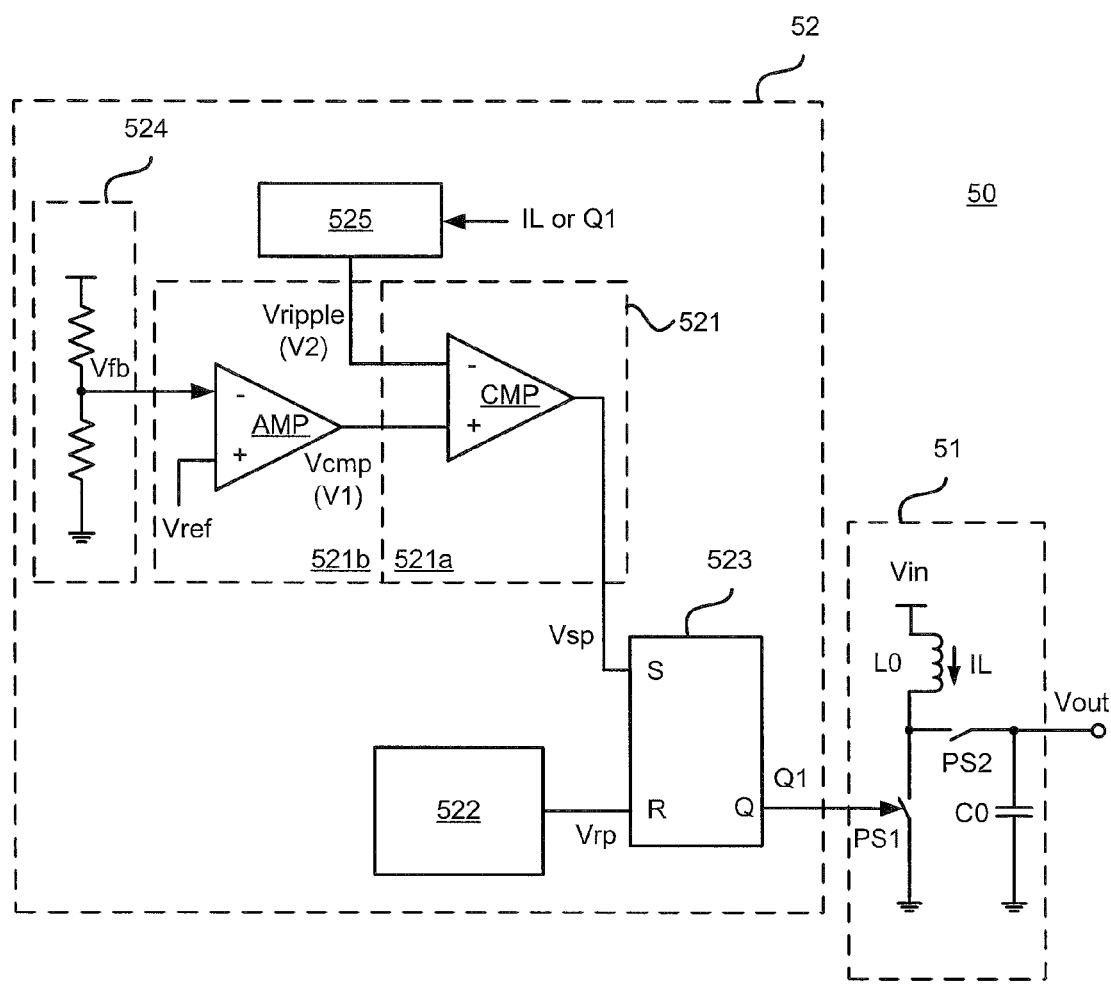
FIG. 5 is a schematic diagram of a switching regulator in accordance with a third embodiment of the present disclosure.

FIG. 5 is a schematic diagram of a switching regulator in accordance with a third embodiment of the present disclosure. In the present embodiment, switching regulator 50 comprises power stage 51 and control circuit 52. Wherein, power stage 51 adopts a boost topology. It may be understood by those skilled in the art that power stage 51 may adopt well-known circuit topologies such as a buck topology and a buck-boost topology as necessary.

It is the same with the first embodiment and the second embodiment that control circuit 52 comprises set pulse generator 521, reset pulse generator 522 and logic circuit 523. Meanwhile, set pulse generator 522 and logic circuit 523 adopt same circuits with that of the second embodiment.

Comparing to the second embodiment, set pulse generator 521 in the present embodiment comprises a current control loop 521a and voltage control loop 521b. Voltage control loop 521b receives feedback voltage Vfb proportional to output voltage Vout and outputs error voltage Vcmp in accordance feedback voltage Vfb and reference voltage Vref. Current control loop 521a generates set pulse Vsp in accordance with either of a voltage representing the inductor current of power stage and a voltage synchronous therewith and error voltage Vcmp.

Particularly, voltage control loop 521b may comprise operational amplifier AMP, meanwhile, current control loop 521a may comprises comparator CMP. Output voltage Vout of the power stage is fed back to an inverting input terminal of operational amplifier AMP directly or through feedback circuit 524, a non-inverting input terminal of which inputs reference voltage Vref. Operational amplifier AMP has an output terminal which is coupled to a non-inverting input terminal of comparator CMP and outputs error voltage Vcmp. An inverting input terminal of comparator CMP is coupled to ripple generator 525 which may be coupled to one end of the inductive element in the power stage (eg. inductor L0 in FIG. 5) and preferably adopt a current detection circuit. The current detection circuit may represent the current through the inductive element as ripple signal Vripple which is implemented to comparator CMP as second voltage V2. Alternatively, ripple generator 525 may generated ripple signal Vripple synchronous with the inductor current in accordance with feedback switching control signal Q1 or a signal synchronous therewith. Comparator CMP outputs set pulse Vsp at energy valley of the inductive element in the power stage by comparing error voltage Vcmp (i.e. first voltage V1) and ripple signal Vripple (i.e. second voltage V2).

In a preferable implementation of the present embodiment, the current detection circuit may be coupled to comparator CMP directly so as to achieve advantages of less elements and compact circuit.

The present embodiment provides an alternative of the set pulse generator.

Figure 6:
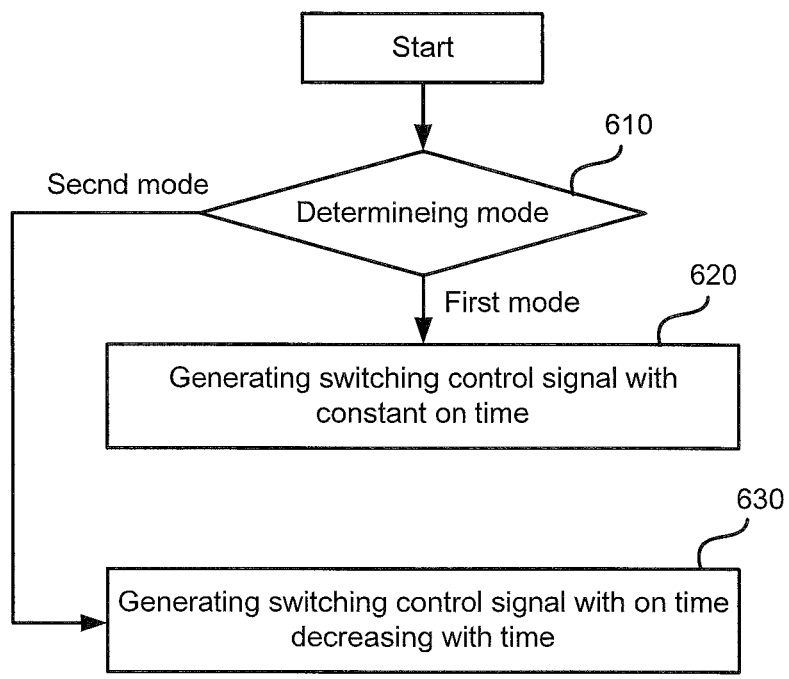
FIG. 6 is a flow chart of a control method for a switching regulator in accordance with a fourth embodiment of the present disclosure.

FIG. 6 is a flow chart of a control method for a switching regulator in accordance with a fourth embodiment of the present disclosure. The method is configured to control the switching regulator in abovementioned embodiment.

The method comprises following steps:

Step 610. the mode of the switching regulator is determined in accordance with a mode signal.

Step 620. when operating in a first mode, a switching control signal with constant on time is generated to control a power switch.

Step 630. when operating in a second mode, a switching control signal with on time decreasing with time is generated to control the power switch.

Preferably, step 630 may further comprises following steps:

Step 631. set pulses are generated at the energy valley of the inductive element in accordance with a reference voltage, a feedback voltage and a ripple signal, wherein, the feedback voltage is obtained in accordance with an output voltage of the power stage.

Step 632. reset pulses are generated in a one to one correspondence with the set pulses, wherein, the time intervals between each reset pulse and the neighboring set pulse preceding thereto decreases with time.

Particularly, step 632 may further comprises following steps:

Step A. a threshold voltage decreasing with time is generated.

Step A may be implemented by means of stopping charging a threshold terminal and discharging it in a predetermined frequency with a current with a predetermined current level.

Step B. a sawtooth wave with same cycle to that of the switching control signal is generated in accordance with the switching control signal.

The step A and the step B are implemented simultaneously.

Step C. by comparing the sawtooth wave and the threshold voltage, the reset pulses is generated when the sawtooth wave rises to the threshold voltage.

In the present embodiment, a switching control signal with decreasing on time is generated to control a switching regulator in a second mode, so that audio noise may be avoided when the switching regulator operates in a light loaded or unloaded condition.

The foregoing description describes specific embodiments of the present invention. However, they have been presented for purposes of illustration and description. It is intended that the scope of the invention be defined by the claims appended hereto and their equivalents. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

I claim:

1. A control circuit for controlling a power switch in a power stage of switching regulator, comprising:
    a set pulse generator configured to generate set pulses in accordance with a feedback voltage, a ripple voltage and a reference voltage, wherein said feedback voltage is obtained from an output voltage of said power stage;
    a reset pulse generator configured to generate reset pulses in a one to one correspondence with said set pulses by comparing a sawtooth wave and a threshold voltage, wherein in a first mode a time interval between each said reset pulse and neighboring set pulse preceding thereto is constant, and in a second mode said time interval decreases with time; and
    a logic circuit configured to generate a switching control signal in accordance with said set pulses and said reset pulses, wherein said switching control signal turns on said power switch when said set pulse occurs and turns off said power switch when said reset pulse occurs,
    wherein said threshold voltage is constant in said first mode and decreases in a predetermined frequency in said second mode so that a frequency of said switching control signal increases in said second mode.

2. The control circuit according to claim 1, wherein, said reset pulse generator comprises:
    a threshold generator configured to generate said threshold voltage in said first mode and in said second mode;
    a sawtooth generator configured to generate said sawtooth wave synchronous with said switching control signal; and
    a first comparing circuit configured to compare said sawtooth wave and said threshold voltage and to output said reset pulse when said sawtooth wave rises to said threshold voltage.

3. The control circuit according to claim 2, wherein, said threshold generator comprises:
    an energy storage circuit charged in said first mode at a threshold terminal and stopping to be charged in said second mode so as to power said threshold terminal based on energy stored therein; and
    a discharger coupled to said threshold terminal and configured to discharge said threshold terminal in said predetermined frequency to obtain said threshold voltage in said second mode.

4. The control circuit according to claim 3, wherein, said discharger comprises a control module, a discharge switch and a second current source, wherein said discharge switch and said second current source are coupled in series between said threshold terminal and a ground, and said control module is coupled to a control terminal of said discharge switch to turn on said discharge switch in said predetermined frequency in said second mode.

5. The control circuit according to claim 4, wherein, said energy storage circuit comprises an input terminal, an intermediate terminal, said threshold terminal, a first current source, a first switch, a first resistor, a first capacitor, a second switch, a second resistor and a second capacitor;

wherein said first current source and said first switch are coupled in series between said input terminal and said intermediate terminal, and said first resistor and said second switch are coupled in series between said intermediate terminal and said ground, and said first resistor is coupled between said intermediate terminal and said threshold terminal, and said second capacitor is coupled between said threshold terminal and said ground;

wherein said first switch and said second switch is on in said first mode and off in said second mode.

6. The control circuit according to claim 5, wherein, said energy storage circuit further comprises a fifth switch coupled between said input terminal and said intermediate terminal in series with said first current source and said first switch and configured to be turned on and off synchronous with said power switch.

7. The control circuit according to claim 6, wherein, said control circuit further comprises ripple generator configured to generate said ripple voltage;

wherein said ripple generator comprises said energy storage circuit shared with said threshold generator; and said ripple generator further comprises a second comparing circuit comprising input terminals coupled with said intermediate terminal and said threshold terminal respectively and configured to output a signal representing a difference between input signals.

8. The control circuit according to claim 1, wherein, said set pulse generator generates said set pulses by comparing superposition of said feedback voltage and said ripple voltage with said reference voltage; or said set pulse generator generates said set pulses by comparing a difference between said feedback voltage and said reference voltage with said voltage signal.

9. The control circuit according to claim 3, wherein said predetermined frequency is greater than 20 kHz.

10. A switching regulator, comprising:

a power stage with a power switch; and a control circuit, comprising:

a set pulse generator configured to generate set pulses in accordance with a feedback voltage, a ripple voltage and a reference voltage, wherein said feedback voltage is obtained from an output voltage of said power stage;

a reset pulse generator configured to generate reset pulses in a one to one correspondence with said set pulses by comparing a sawtooth wave and a threshold voltage, wherein in a first mode a time interval between each said reset pulse and neighboring set pulse preceding thereto is constant, and in a second mode said time interval decreases with time; and a logic circuit configured to generate a switching control signal in accordance with said set pulses and said reset pulses, wherein said switching control signal turns on said power switch when said set pulse occurs and turns off said power switch when said reset pulse occurs, wherein said threshold voltage is constant in said first mode and decreases in a predetermined frequency in said second mode so that a frequency of said switching control signal increases in said second mode.

11. The switching regulator according to claim 10, wherein, said reset pulse generator comprises:

a threshold generator configured to generate said threshold voltage in said first mode and a decreasing threshold voltage in said second mode;

a sawtooth generator configured to generate said sawtooth wave synchronous with said switching control signal; and a first comparing circuit configured to compare said sawtooth wave and said threshold voltage and to output said reset pulse when said sawtooth wave rises to said threshold voltage.

12. The switching regulator according to claim 11, wherein, said threshold generator comprises:

an energy storage circuit charged in said first mode at a threshold terminal and stopping to be charged in said second mode so as to power said threshold terminal based on energy stored therein; and a discharger coupled to said threshold terminal and configured to discharge said threshold terminal in a said predetermined frequency to obtain said threshold voltage in said second mode.

13. The switching regulator according to claim 12, wherein, said discharger comprises a control module, a discharge switch and a second current source, wherein said discharge switch and said second current source are coupled in series between said threshold terminal and a ground, and said control module is coupled to a control terminal of said discharge switch to turn on said discharge switch in said predetermined frequency in said second mode.

14. The switching regulator according to claim 13, wherein, said energy storage circuit comprises an input terminal, an intermediate terminal, said threshold terminal, a first current source, a first switch, a first resistor, a first capacitor, a second switch, a second resistor and a second capacitor;

wherein said first current source and said first switch are coupled in series between said input terminal and said intermediate terminal, and said first resistor and said second switch are coupled in series between said intermediate terminal and said ground, and said first resistor is coupled between said intermediate terminal and said threshold terminal, and said second capacitor is coupled between said threshold terminal and said ground;

wherein said first switch and said second switch is on in said first mode and off in said second mode.

15. The switching regulator according to claim 14, wherein, said energy storage circuit further comprises a fifth switch coupled between said input terminal and said intermediate terminal in series with said first current source and said first switch and configured to be turned on and off synchronous with said power switch.

16. The switching regulator according to claim 15, wherein, said control circuit further comprises ripple generator configured to generate said ripple voltage;

wherein said ripple generator comprises said energy storage circuit shared with said threshold generator; and said ripple generator further comprises a second comparing circuit comprising input terminals coupled with said intermediate terminal and said threshold terminal respectively and configured to output a signal representing a difference between input signals.

17. A control method for a switching regulator comprising a power stage with a power switch and a control circuit therefor, comprising:

generating set pulses in accordance with a reference voltage, a feedback voltage and a ripple voltage, wherein, said feedback voltage is obtained from an output voltage of said power stage;

generating reset pulses in a one to one correspondence with said set pulses by comparing a sawtooth wave and a threshold voltage, wherein in a first mode a time interval between each said reset pulse and neighboring set pulse preceding thereto is constant, and in a second mode said time interval decreases with time; and generating a switching control signal in accordance with said set pulses and said reset pulses, wherein said switching control signal turns on said power switch when said set pulse occurs and turns off said power switch when said reset pulse occurs; and wherein said threshold voltage is constant in said first mode and decreases in a predetermined frequency in said second mode so that a frequency of said switching control signal increases in said second mode.

18. The control method according to claim 17, wherein said sawtooth wave is synchronous with said switching control signal and said reset pulses is generated when said sawtooth wave rises to said threshold voltage.

19. The control method according to claim 18, wherein, said threshold voltage is generated by charging a threshold terminal is said first mode, and by stopping charging said threshold terminal; and discharging a voltage of said threshold terminal in said predetermined frequency with current at a predetermined level in said second mode.

\* \* \* \* \*